(12) United States Patent
Akman

(10) Patent No.: US 10,754,336 B2
(45) Date of Patent: Aug. 25, 2020

(54) USING ENVIRONMENTAL INFORMATION TO ESTIMATE SENSOR FUNCTIONALITY FOR AUTONOMOUS VEHICLES

(71) Applicant: Waymo LLC, Mountain View, CA (US)

(72) Inventor: Mehmet Arda Akman, Santa Cruz, CA (US)

(73) Assignee: Waymo LLC, Mountain View, CA (US)

( * ) Notice: Subject to any disclaimer, the term of this patent is extended or adjusted under 35 U.S.C. 154(b) by 129 days.

(21) Appl. No.: 16/014,591

(22) Filed: Jun. 21, 2018

(65) Prior Publication Data

US 2019/0339694 A1 Nov. 7, 2019

Related U.S. Application Data

(60) Provisional application No. 62/667,167, filed on May 4, 2018.

(51) Int. Cl.
*G05D 1/00* (2006.01)
*B60W 50/02* (2012.01)
(Continued)

(52) U.S. Cl.
CPC ........... *G05D 1/0061* (2013.01); *B60W 40/02* (2013.01); *B60W 50/0205* (2013.01);
(Continued)

(58) Field of Classification Search
CPC ......... B60R 1/00; B60R 16/037; G01C 21/30; G01C 21/26; G01C 21/20; G06T 7/85; G06T 15/10; G06T 5/50; G06T 7/593; G06T 7/22; G05D 1/0061; G05D 1/0088; G06K 9/00805; G06K 9/00818; G06K 9/00798; G08G 1/166; G03B 13/32; B62D 15/029; B62D 6/00; B62D 15/025; G02B 5/003; G02B 26/005; G02F 1/29; H04N 5/2254; H04N 13/211; H04N 13/271; H04N 13/239; H04N 13/204; H04N 13/246; G01S 17/89; G01S 17/875; B60W 30/09; B60W 10/22; B60W 30/16; B60W 10/04;
(Continued)

(56) References Cited

U.S. PATENT DOCUMENTS 9,062,979 B1 * 6/2015 Ferguson ............... G01C 21/30
9,255,805 B1    2/2016 Ferguson et al.
(Continued)

FOREIGN PATENT DOCUMENTS

CN         10655349         4/2017

*Primary Examiner* — Behrang Badii
(74) *Attorney, Agent, or Firm* — Botos Churchill IP Law

(57) ABSTRACT

Aspects of the disclosure relate to controlling a vehicle having an autonomous driving mode. This may include receiving, by one or more processors of the vehicle, first information identifying a current relative humidity measurement within a sensor housing of a vehicle having an autonomous driving mode. The relative humidity measurement and pre-stored environmental map information may be used by the one or more processors to estimate a condition of a sensor within the sensor housing at a future time. This estimated condition may be used by the one or more processors to control the vehicle.

20 Claims, 11 Drawing Sheets

(51) Int. Cl.
  *B60W 50/029*   (2012.01)
  *B60W 40/02*    (2006.01)
  *G08G 1/00*     (2006.01)
  *H02J 7/34*     (2006.01)
  *G01C 21/36*    (2006.01)
  *H02J 7/00*     (2006.01)
  *B60W 30/18*    (2012.01)
  *G01C 21/30*    (2006.01)
  *B60W 30/188*   (2012.01)

(52) U.S. Cl.
  CPC .......... *B60W 50/029* (2013.01); *B60W 30/18* (2013.01); *B60W 30/188* (2013.01); *B60W 2050/0215* (2013.01); *B60W 2050/0292* (2013.01); *B60W 2400/00* (2013.01); *B60W 2555/20* (2020.02); *G01C 21/30* (2013.01); *G01C 21/36* (2013.01); *G08G 1/00* (2013.01); *H02J 7/0018* (2013.01); *H02J 7/34* (2013.01); *H02J 7/342* (2020.01)

(58) Field of Classification Search
  CPC .... B60W 10/20; B60W 10/184; B60W 40/02; B60W 50/0205; B60W 50/029; B60W 2555/20; B60W 2050/0215; B60W 2050/0292; B60W 2400/00; B60W 4/46; B60G 17/018
  See application file for complete search history.

(56)  References Cited

U.S. PATENT DOCUMENTS

| | | | |
|---|---|---|---|
| 9,308,917 B2 * | 4/2016 | Oh | G06T 7/85 |
| 2006/0208169 A1 | 9/2006 | Breed et al. | |
| 2017/0010174 A1 | 1/2017 | Melen | |
| 2017/0276788 A1 | 9/2017 | Wodrich | |
| 2017/0293199 A1 * | 10/2017 | Kim | H04N 7/183 |
| 2018/0056996 A1 * | 3/2018 | Lee | B60T 8/17557 |
| 2018/0127001 A1 * | 5/2018 | Ricci | B60R 25/2018 |
| 2018/0341274 A1 * | 11/2018 | Donnelly | B60R 16/037 |
| 2019/0052119 A1 * | 2/2019 | Hendrix | H02J 7/0018 |
| 2019/0111932 A1 * | 4/2019 | Falconer | B60W 30/188 |
| 2019/0130765 A1 * | 5/2019 | Tulpule | G08G 1/096775 |
| 2019/0276022 A1 * | 9/2019 | Bae | B60W 30/18 |
| 2019/0349516 A1 * | 11/2019 | Lee | H04N 5/2254 |

* cited by examiner

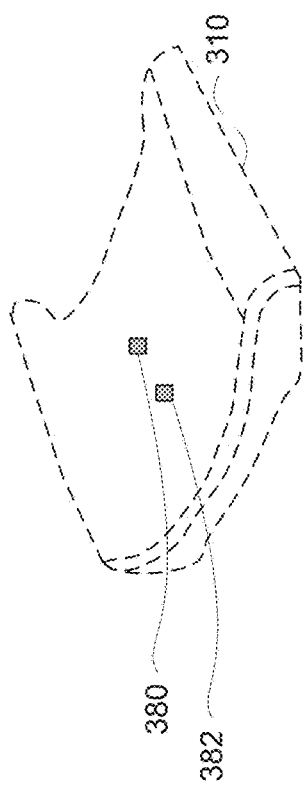
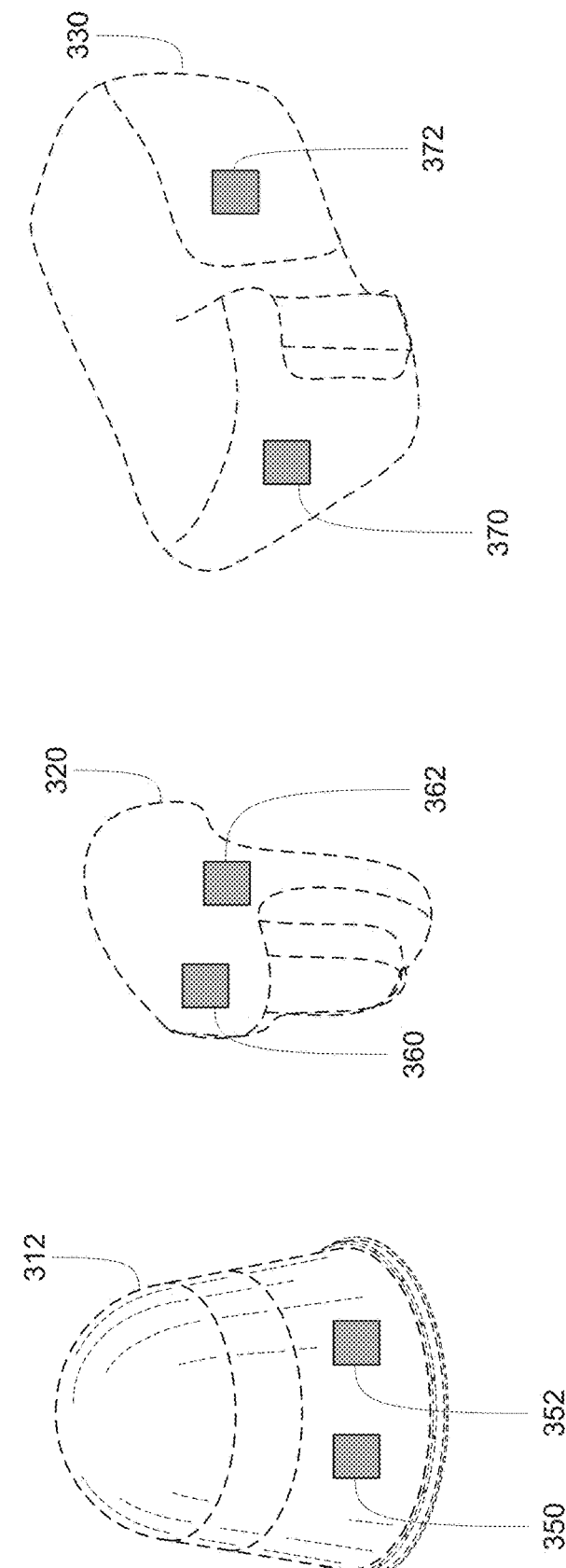
FIGURE 3B
FIGURE 3C
FIGURE 3D
FIGURE 3E

USING ENVIRONMENTAL INFORMATION TO ESTIMATE SENSOR FUNCTIONALITY FOR AUTONOMOUS VEHICLES

CROSS-REFERENCE TO RELATED APPLICATIONS

The present application claims the benefit of the filing date of U.S. Provisional Patent Application No. 62/667,167 filed May 4, 2018, the disclosure of which is hereby incorporated herein by reference.

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location without the need for additional input from the passenger or any other human. Thus, such vehicles may be used to provide transportation services.

Other systems which provide transportation services typically include drivers or conductors who are tasked with making decisions about how to operate vehicles. Such services may include some backend server systems which can dispatch vehicles to certain locations to provide transportations services as well as provide fleet management and vehicle staging instructions.

BRIEF SUMMARY

One aspect of the disclosure provides a method. The method includes receiving, by one or more processors, first information identifying a current relative humidity measurement within a sensor housing of a vehicle having an autonomous driving mode; using, by the one or more processors, the relative humidity measurement and pre-stored environmental map information to estimate a condition of a sensor within the sensor housing at a future time; and controlling, by the one or more processors, the vehicle in accordance with the estimated condition.

In one example, the method also includes receiving second information identifying ambient temperature information for a driving environment of a vehicle having an autonomous driving mode and using the received second information to update the environmental map, and wherein the updated environmental map information is compared to the relative humidity measurement. In another example, the method also includes receiving second information identifying a current temperature within the sensor housing, wherein the environmental map includes temperature information, estimating the estimated condition includes using the temperature information to estimate an expected change in temperature within the sensor housing. In this example, estimating the estimated condition includes estimating how the expected change in temperature and current relative humidity measurement will affect functionality of the sensor. In another example, the method also includes determining a current dew point within the sensor housing, wherein estimating the estimated condition includes using the current dew point to estimate an expected change in condensation within the sensor housing. In another example, the environmental map includes dew point information and estimating the estimated condition includes using the dew point information to estimate an expected change in condensation within the sensor housing. In another example, the method also includes receiving second information identifying ambient relative humidity information for a driving environment of a vehicle having an autonomous driving mode; and using the received second information to update the environmental map, and wherein estimating the estimated condition includes comparing the updated environmental map information to the relative humidity measurement. In another example, the method also includes receiving second information identifying a current temperature within the sensor housing, and wherein the current temperature is used to estimate the estimated condition. In another example, controlling the vehicle includes preventing the vehicle from entering the autonomous driving mode. In another example, controlling the vehicle includes: preventing the vehicle from entering the autonomous driving mode until the sensor housing is serviced; and, after the sensor housing has been serviced, allowing the vehicle to enter the autonomous driving mode. In another example, controlling the vehicle includes: identifying one or more geographic areas that are expected to affect operation of the sensor in a particular way based on the estimated condition; determining a route to a destination that avoids the identified one or more geographic areas; and controlling the vehicle to follow the route in the autonomous driving mode. In another example, the method also includes receiving second information identifying a new current relative humidity measurement within the sensor housing; and using the relative humidity measurement and the new relative humidity measurement to determine whether there is a problem with a seal of the sensor housing.

Another aspect of the disclosure provides a system comprising one or more processors. The one or more processors are configured to receive first information identifying a current relative humidity measurement within a sensor housing of a vehicle having an autonomous driving mode; use the relative humidity measurement and pre-stored environmental map information to estimate a condition of a sensor within the sensor housing at a future time; and control the vehicle in accordance with the estimated condition.

In one example, the one or more processors are further configured to: receive second information identifying ambient temperature information for a driving environment of a vehicle having an autonomous driving mode; and use the received second information to update the environmental map, and wherein the updated environmental map information is compared to the relative humidity measurement. In another example, the environmental map includes temperature information and the one or more processors are further configured to: receive second information identifying a current temperature within the sensor housing; and estimate the estimated condition by using the temperature information to estimate an expected change in temperature within the sensor housing. In this example, the one or more processors are further configured to estimate the estimated condition by estimating how the expected change in temperature and current relative humidity measurement will affect functionality of the sensor. In another example, the method also includes determining receiving second information identifying a current dew point within the sensor housing, wherein estimating the estimated condition includes using the current dew point to estimate an expected change in condensation within the sensor housing. In another example, the environmental map includes dew point information and estimating the estimated condition includes using the dew point information to estimate an expected change in condensation within the sensor housing. In another example, the one or more processors are further configured to: receive second information identifying ambient relative humidity information for a driving environment of a vehicle having an autonomous driving mode; and use the received second information to update the environmental map, and compare environmental map information to the relative humidity measurement in order to estimate the estimated condition. In another example, the system also includes the vehicle.

BRIEF DESCRIPTION OF THE DRAWINGS

FIGS. 3B-3E are an example representative transparent views of sensor housings in accordance with aspects of the disclosure.

DETAILED DESCRIPTION

Overview

Figure 1:
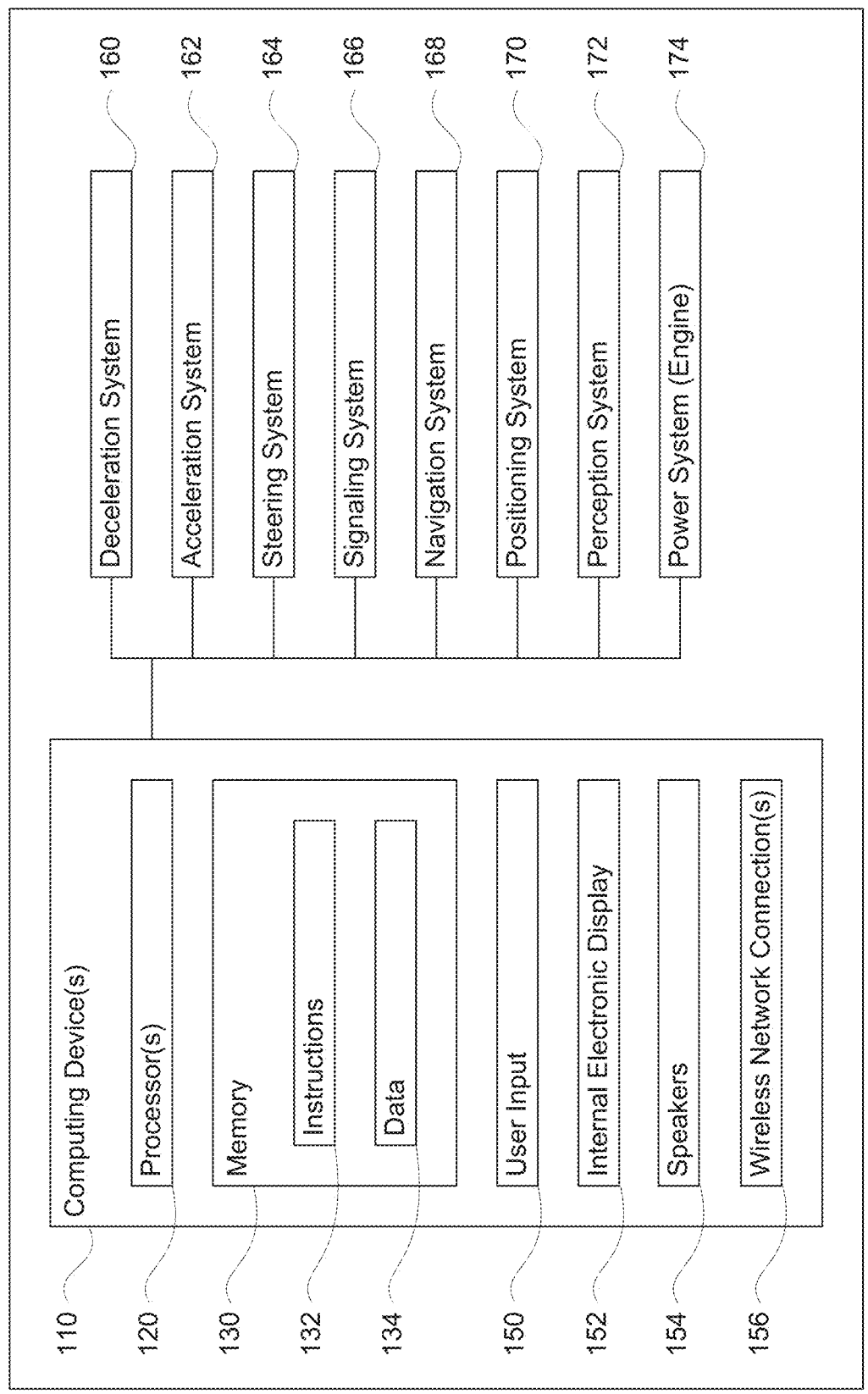
FIG. 1 is a functional diagram of an example vehicle in accordance with an exemplary embodiment.

The technology relates to using environmental information to determine sensor functionality for an autonomous vehicle. This, in turn, may be used to determine whether and how to control the autonomous vehicle. Such autonomous vehicles may include sophisticated perception systems that include various types of sensors, some of which may be sensitive to condensation. For instance, a change in relative humidity levels between two locations, such as inside of a garage or building to outside of a garage or building, can cause a buildup of condensation on the interior of such sensors. This can be exacerbated where sensor housings are not completely sealed, which can require great expense and difficulty where the sensor housing is not made of glass, e.g., for safety, engineering or other reasons, and are able to exchange moisture with the vehicle's external environment. To address this, the vehicle's computing devices may determine whether a sensor will function properly based on actual or expected environmental conditions.

For instance, a plurality of vehicles, which may belong to a fleet of vehicles including autonomous and non-autonomous vehicles, may drive around and constantly collect data regarding environmental conditions. This data may be reported back to a server system which can use the reports to generate one or more environmental maps identifying any of the reported information. Additional information, such as information collected by stationary sensors mounted at various locations may also be included in the maps. These environmental maps may be sent to the fleet of vehicles, for instance, to the computing devices of any autonomous vehicles. In some instances, these maps may be updated in real time at a vehicle based on reports received from one or more server computing devices or directly other vehicles.

To determine how the ambient temperature and relative humidity will affect the vehicle's sensors, the vehicle's computing devices may receive sensor information from inside of the sensor housing. For instance, temperature and relative humidity measurements may be used to determine a dew point for the area within the sensor housing. Using this information, a vehicle's computing devices may be able to determine whether the vehicle's sensors can function properly given current conditions inside and outside the sensor housing.

Based on whether the vehicle's sensors would not be able to function properly, the computing devices may make a determination of whether it is safe or appropriate to drive the vehicle autonomously based on information that will be generated by those sensors. For instance, depending on the type and field of view of the sensor (i.e. whether another sensor is properly functioning and available to capture similar information or not), it may not be safe or appropriate to allow the computing devices to control the vehicle autonomously. As such, the computing devices may prevent the vehicle from entering the autonomous driving mode, and may require that the vehicle and/or sensor housing be serviced before doing so.

The features described herein allow an autonomous vehicle's computing devices to make determinations about whether and, in some cases, how to control the vehicle in an autonomous driving mode. By monitoring the environment within a sensor housing and comparing that to near real time ambient environmental information for areas through which the vehicle is expected to drive, the computing devices may estimate how the ambient environment and environment within the sensor housing will affect operation of a sensor within the sensor housing or whether that housing has been compromised. This in turn, may allow the computing devices to determine whether it is safe to drive autonomously as well as to route around areas which are likely to affect the sensor operation. As a result, the operation of such autonomous vehicles is much safer for passengers, cargo, as well as other road users.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be control computing devices of an autonomous driving computing system or incorporated into vehicle 100. The autonomous driving computing system may capable of communicating with various components of the vehicle in order to control the movement of vehicle 100 according to primary vehicle control code of memory 130. For example, returning to FIG. 1, computing devices 110 may be in communication with various systems of vehicle 100, such as deceleration system 160, acceleration system 162, steering system 164, signaling system 166, navigation system 168, positioning system 170, perception system 172, and power system 174 (i.e. the vehicle's engine or motor) in order to control the movement, speed, etc. of vehicle 100 in accordance with the instructions 134 of memory 130. Again, although these systems are shown as external to computing devices 110, in actuality, these systems may also be incorporated into computing devices 110, again as an autonomous driving computing system for controlling vehicle 100.

As an example, computing devices 110 may interact with one or more actuators of the deceleration system 160 and/or acceleration system 162, such as brakes, accelerator pedal, and/or the engine or motor of the vehicle, in order to control the speed of the vehicle. Similarly, one or more actuators of the steering system 164, such as a steering wheel, steering shaft, and/or pinion and rack in a rack and pinion system, may be used by computing devices 110 in order to control the direction of vehicle 100. For example, if vehicle 100 is configured for use on a road, such as a car or truck, the steering system may include one or more actuators to control the angle of wheels to turn the vehicle. Signaling system 166 may be used by computing devices 110 in order to signal the vehicle's intent to other drivers or vehicles, for example, by lighting turn signals or brake lights when needed.

Figure 2A:
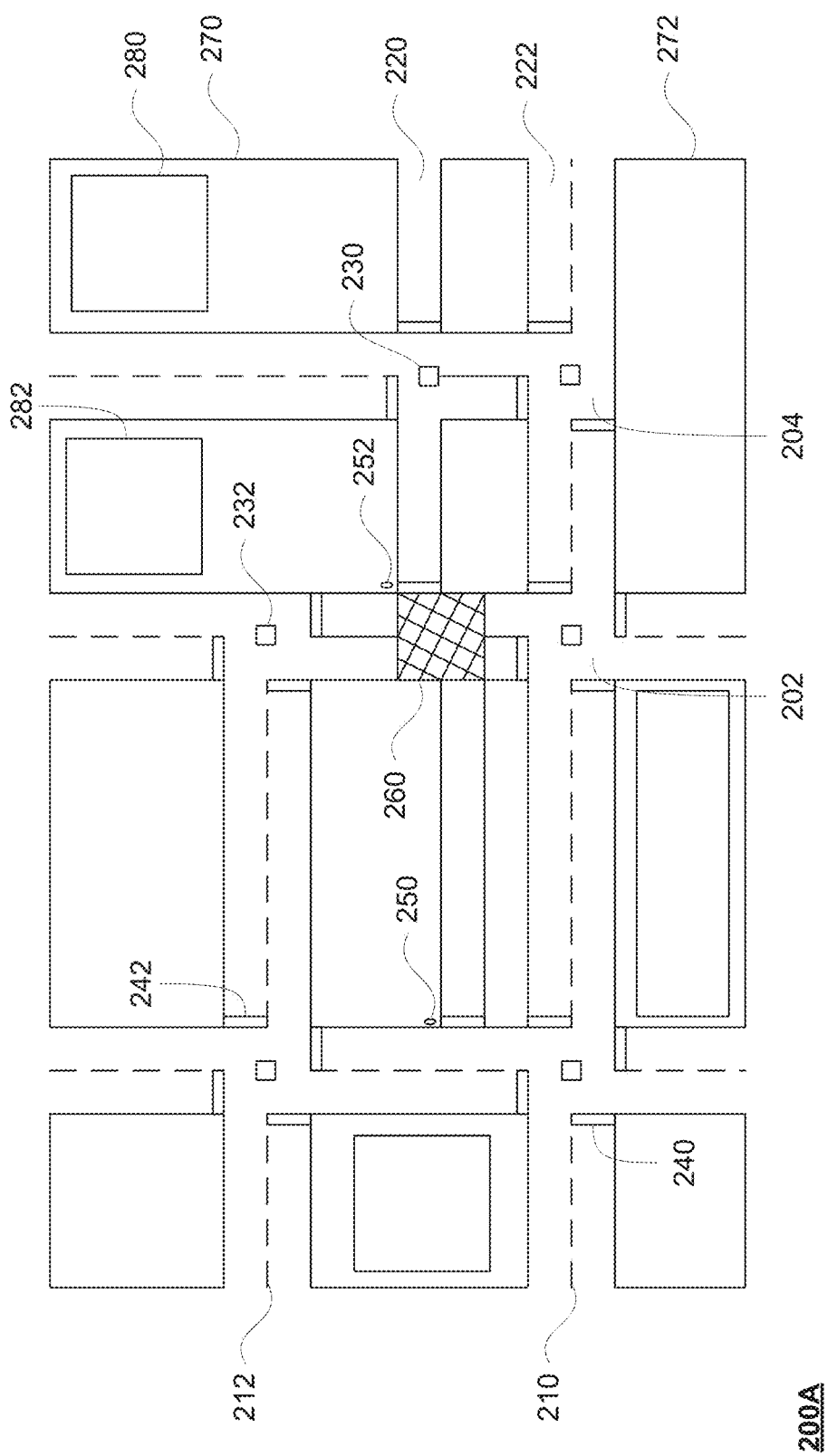
FIG. 2A is an example of map information in accordance with aspects of the disclosure.

Navigation system 168 may be used by computing devices 110 in order to determine and follow a route to a location. In this regard, the navigation system 168 and/or data 132 may store detailed roadmap information, e.g., highly detailed maps identifying the shape and elevation of roadways, lane lines, intersections, crosswalks, speed limits, traffic signals, buildings, signs, real time traffic information, vegetation, or other such objects and information. For instance, FIG. 2A is an example of roadmap information 200A for a section of roadway. In this example, the roadmap information 200A includes information identifying the shape, location, and other characteristics of intersections 202, 204, lane lines 210, 212, lanes 220, 222, traffic signal lights 230, 232, stop lines 240, 242, stop signs 250, 252, as well as other road features such as "Do Not Block the Box" area 260, as well as non-drivable areas 270, 272 and buildings, parking lots and/or spaces, or other structure 280, 282 within such areas. Of course, given the number and nature of the features of the roadmap information 200A, only a few of such features are identified for simplicity and ease of understanding. Although the examples shown relate to right hand-drive areas, the features described herein are also suitable for left-hand drive areas as well.

Although the roadmap information is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

In addition to the map information discussed above, the data 138 may also store environmental map information. These environmental maps may thus include fairly detailed information about current conditions at a block by block or street by street granularity. Additional information, such as information collected by stationary sensors mounted at various locations may also be included in the maps. These environmental maps may be sent to the fleet of vehicles, for instance, to the computing devices of such vehicles. In some instances, these maps may be updated in real time at a vehicle based on reports received from a server computing devices or directly other vehicles.

Figure 2B:
FIG. 2B is an example of environmental map information in accordance with aspects of the disclosure.

FIG. 2B is an example of environmental map 200B including environmental information for the same section of roadway of FIG. 2A. In this regard, the features of FIG. 2B are depicted as overlaid on the features of map information 200A for ease of understanding, although this may not necessarily be the case. Each of blocks 290-299 may represent ambient environmental conditions including, for instance, temperature, relative humidity, dew point, solar irradiance, wind, and air quality measurements or data for specific locations or areas within the section of roadway. As an example, the shading of blocks 290-292 may represent lower relative humidity levels than blocks 293-299, the shading of blocks 293-297 may represent lower relative humidity levels than blocks 298 and 299, and the shading of blocks 298 and 299 may represent higher relative humidity levels than blocks 290-297. In addition, all or some of the information represented by blocks 290-299 may be collected by sensors of a vehicle such as vehicle 100 or other vehicles of the fleet, such as vehicle 100A and/or 100B as discussed further below. Although the information in this example is depicted as discrete blocks, this is only for ease of understanding. Information may correspond to specific points or areas with different shapes and sizes depending on the types of information represented by such areas. As an example, the environmental map information may also be represented as a heat map.

The environmental map may also be supplemented with additional information collected or provided by sources other than the vehicles of a fleet of vehicles. For instance, all or some of the information represented by blocks 290-299 may be collected by sensors that are fixed proximate to or within the areas represented by such blocks. In addition or alternatively, the environmental map may also include weather information provided by various sources such as online weather reporting services, mobile devices, such as mobile phones, with thermometer or pressure sensors, mobile devices with network access such as mobile phones, tablets or internet of things (IOT) devices, etc. Positioning system 170 may be used by computing devices 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. In the case where the vehicle is a passenger vehicle such as a minivan, the minivan may include a laser or other sensors mounted on the roof or other convenient location.

Figure 3A:
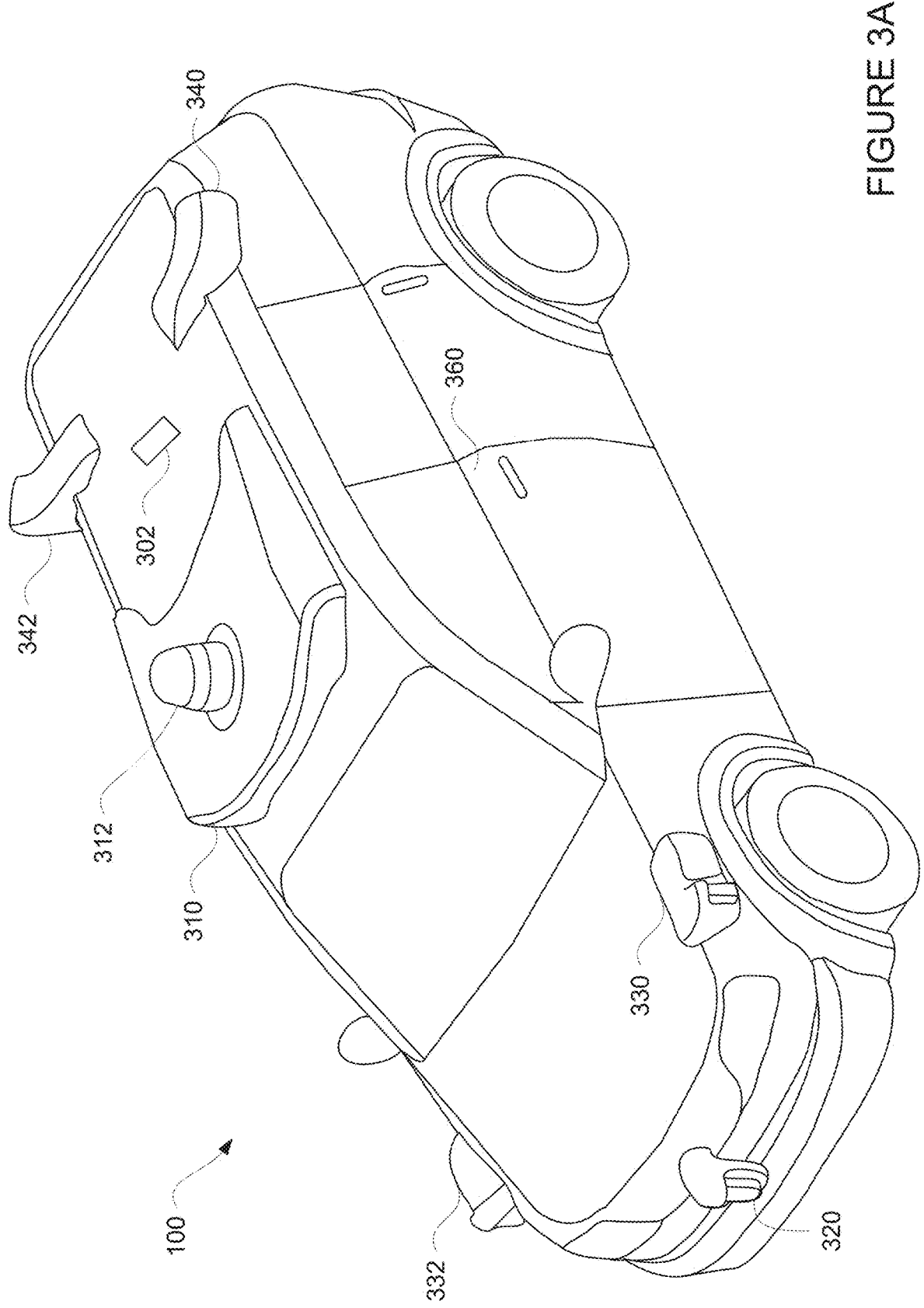
FIG. 3A is an example external view of a vehicle in accordance with aspects of the disclosure.

For instance, FIG. 3A is an example external view of vehicle 100. In this example, sensor box 302 may house a plurality of sensors, such as one or more thermometers for measuring ambient temperature outside of the vehicle, hygrometers for measuring ambient relative humidity outside of the vehicle, solar irradiance sensors which can measure various wavelengths in the solar radiance spectrum (UV, IR, etc), wind sensors such as anemometers for measuring wind speed and direction, as well as other sensors, such as those that may be used to determine air quality such as those that detect particulate matter (PM). The output of the sensors of the sensor box may be sent to the computing devices 110 for further processing and/or transmission to remote computing devices. The location of the sensor box, shown as roof panel in FIG. 3A, may be selected in order to reduce the likelihood of inaccurate readings due to warm air from other heat sources such as the exhaust system or engine compartment of the vehicle or exhaust gasses from other vehicles. In addition, although sensor box 302 is depicted as a single box at a single location on the vehicle, the aforementioned sensors of the sensor box may actually be housed in a plurality of such sensor boxes located at different locations on the vehicle.

In addition, a roof-top sensor housing 310 and a dome sensor housing 312 may include one or more lidar sensors, cameras, and/or radar units. In addition, housing 320 located at the front end of vehicle 100 and housings 330, 332 on the driver's and passenger's sides of the vehicle may each store a lidar sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top sensor housing 310. In this regard, each of housings 310, 312, 320, 330, 332, 340, and 342 may be considered sensor housings any or all of the aforementioned sensors may be considered a part of the vehicle's perception system 172.

FIG. 3B is a representative transparent view of housing 312, FIG. 3C is a representative transparent view of housing 320, FIG. 3D is a representative transparent view of housing 330, and FIG. 3E is a representative transparent view of housing 310. Referring to FIG. 3B, as noted above, the housing 312 may include a lidar sensor (details of which are not shown) as well as various cameras and radar units (details of which are not shown). In addition, the housing may include one or more temperature and relative humidity sensors 350, 352 which can detect and identify current temperature and relative humidity levels within the dome sensor housing. This information may be sent to the computing devices 110 for processing, for instance, to determine a dew point for the area within the sensor housing.

Referring to FIG. 3C, housing 320 may include a lidar sensor (details of which are not shown) as well as one or more temperature and relative humidity sensors 360, 362 which can detect and identify current temperature and relative humidity levels within the housing 320. This information may also be sent to the computing devices 110 for processing, for instance, to determine a dew point for the area within the sensor housing.

Similarly, referring to FIG. 3D and as noted above, housing 330 may include a lidar sensor (details of which are not shown) as well as one or more temperature and relative humidity sensors 370, 372 which can detect and identify current temperature and relative humidity levels within the housing 330. This information may also be sent to the computing devices 110 for processing. Housing 332 may be configured similarly to housing 330, and thus, may also include one or more temperature and relative humidity sensors as well housing 330.

Referring to FIG. 3E, as noted above, the housing 312 may include a lidar sensor (details of which are not shown) as well as various cameras and radar units (details of which are not shown). In addition, the housing may include one or more temperature and relative humidity sensors 380, 382 which can detect and identify current temperature and relative humidity levels within the dome housing. This information may be sent to the computing devices 110 for processing, for instance, to determine a dew point for the area within the sensor housing.

The computing devices 110 may control the direction and speed of the vehicle by controlling various components. By way of example, computing devices 110 may navigate the vehicle to a destination location completely autonomously using data from the detailed map information and navigation system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
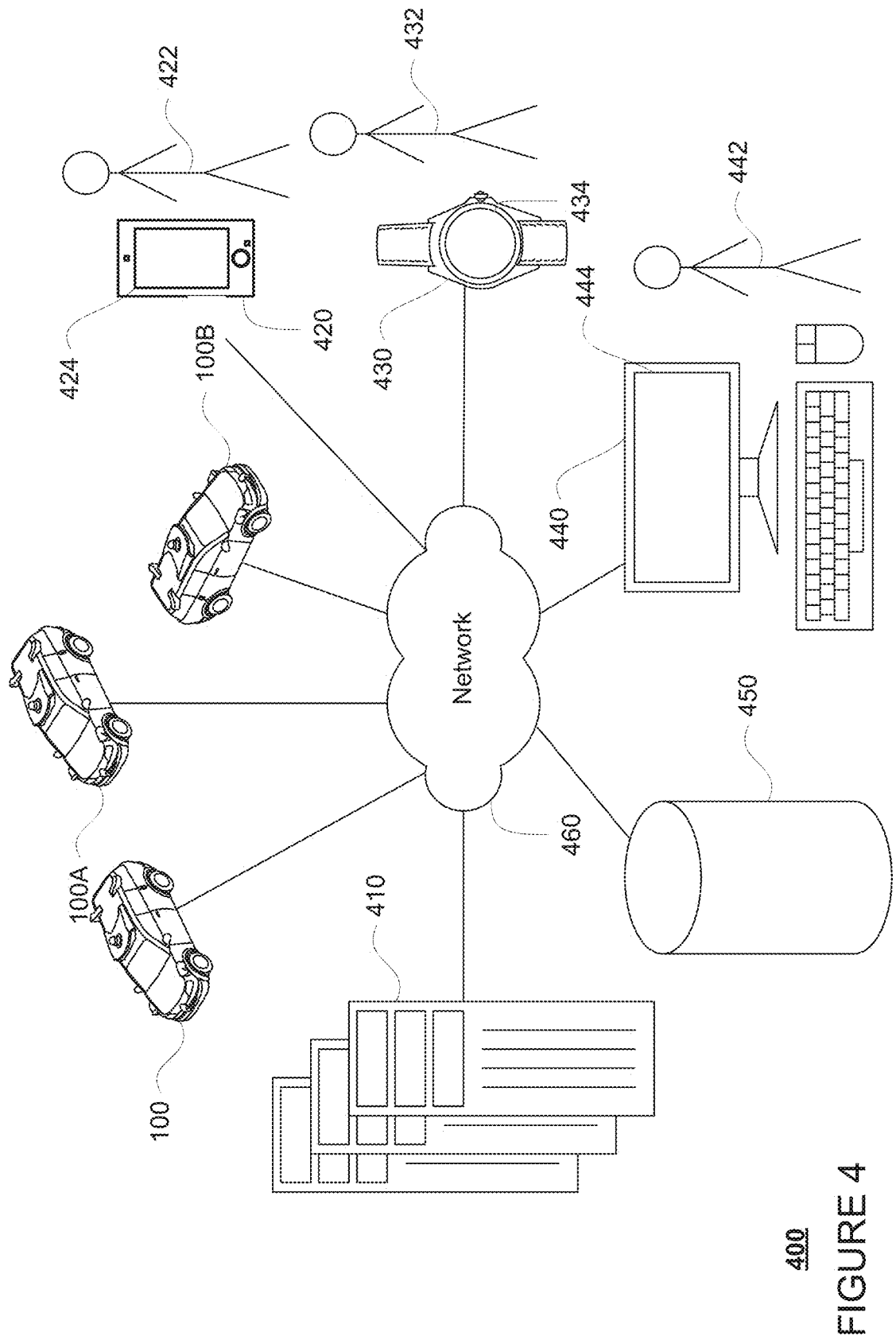
FIG. 4 is a pictorial diagram of an example system in accordance with an exemplary embodiment.
Figure 5:
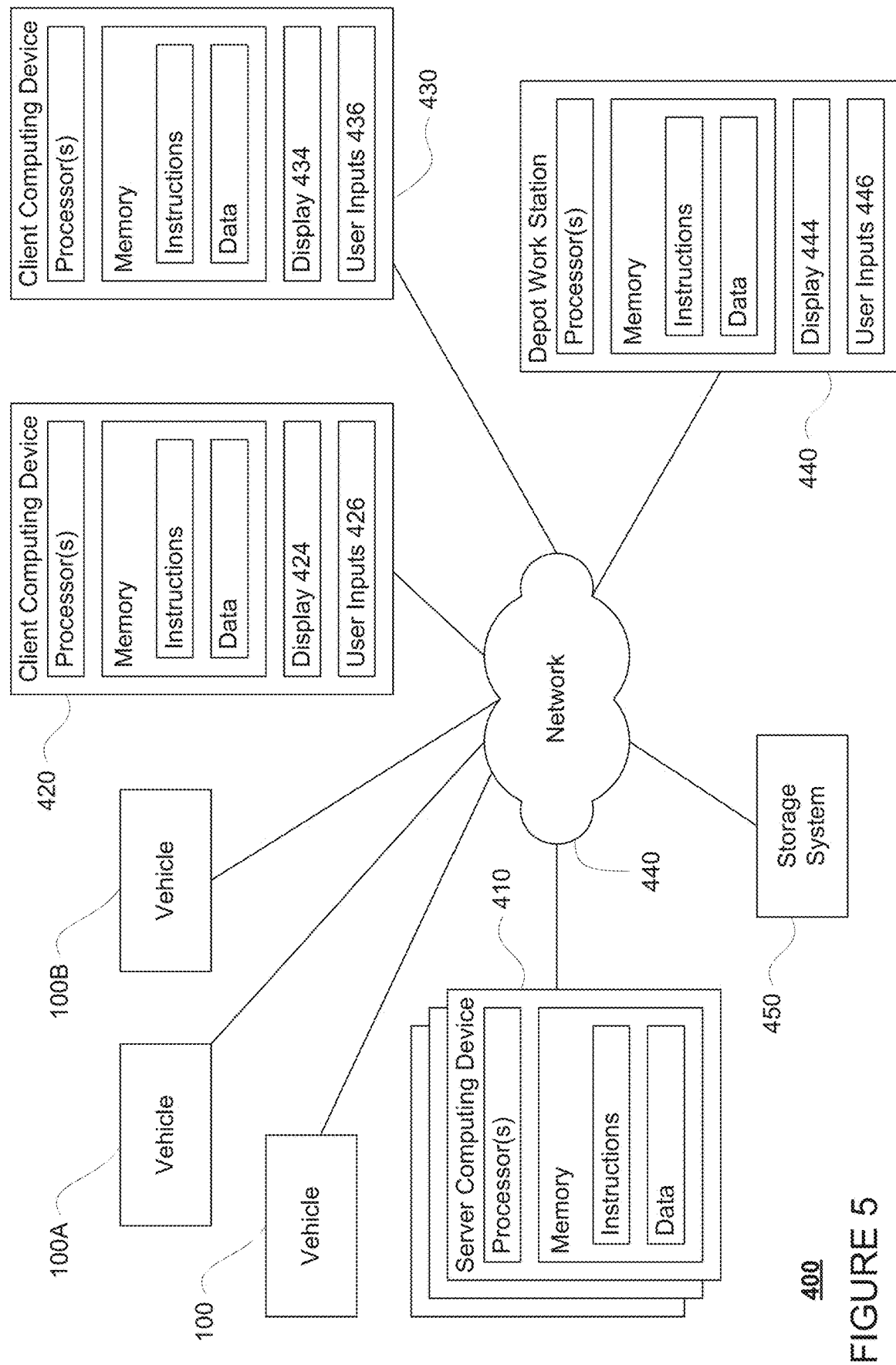
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicles 100A, 100B which may be configured the same as or similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A, 100B as well as computing devices 420, 430, 440 via the network 460. For example, vehicles 100, 100A, 100B may be a part of a fleet of vehicles that can be dispatched by server computing devices to various locations. In this regard, the server computing devices 410 may function as a dispatching system. In addition, the vehicles of the fleet may periodically send the server computing devices location information provided by the vehicle's respective positioning systems as well as other information relating to the status of the vehicles discussed further below, and the one or more server computing devices may track the locations and status of each of the vehicles of the fleet.

In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices 410, in order to perform some or all of the features described herein. For instance, as the vehicles of the fleet drive around, such as vehicles 100, 100A, and 110B, these vehicles may constantly and/or periodically broadcast to the dispatching system 410 information about the environmental conditions through which such vehicles are currently driving. This may include, for example, information from the sensor boxes 302 of the vehicles of the fleet of vehicles. The dispatching system 410 may store and/or update this environmental information in storage system 450. For instance, the dispatching system 410 may maintain an environmental map including environmental information the same as or similar to the environmental map 200B of FIG. 2B. In this regard, the server computing devices 410 may receive and/or retrieve information from sources other than the fleet of vehicles, such as the aforementioned stationary devices and or other sources of information such as online weather reporting services, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

A plurality of vehicles, for instance which may belong to the fleet of vehicles discussed above, may drive around and constantly collect data regarding ambient environmental conditions including, for instance, temperature, relative humidity, dew point, solar irradiance, wind, and air quality data. For instance, vehicle 100 may collect such data via the sensors of sensor box 302. This data may be reported back to server computing devices via network 460, such as server computing devices 410. The server computing devices 410 may receive the data reports and track the received data in storage system 450, for instance, by creating or updating a local version of the environmental map 200B stored in the storage system 450. In this regard, the server computing devices 410 may have up to date information about the ambient temperature, relative humidity, dew point, solar irradiance, wind, and air quality of the section of roadway for the environmental map.

Figure 6:
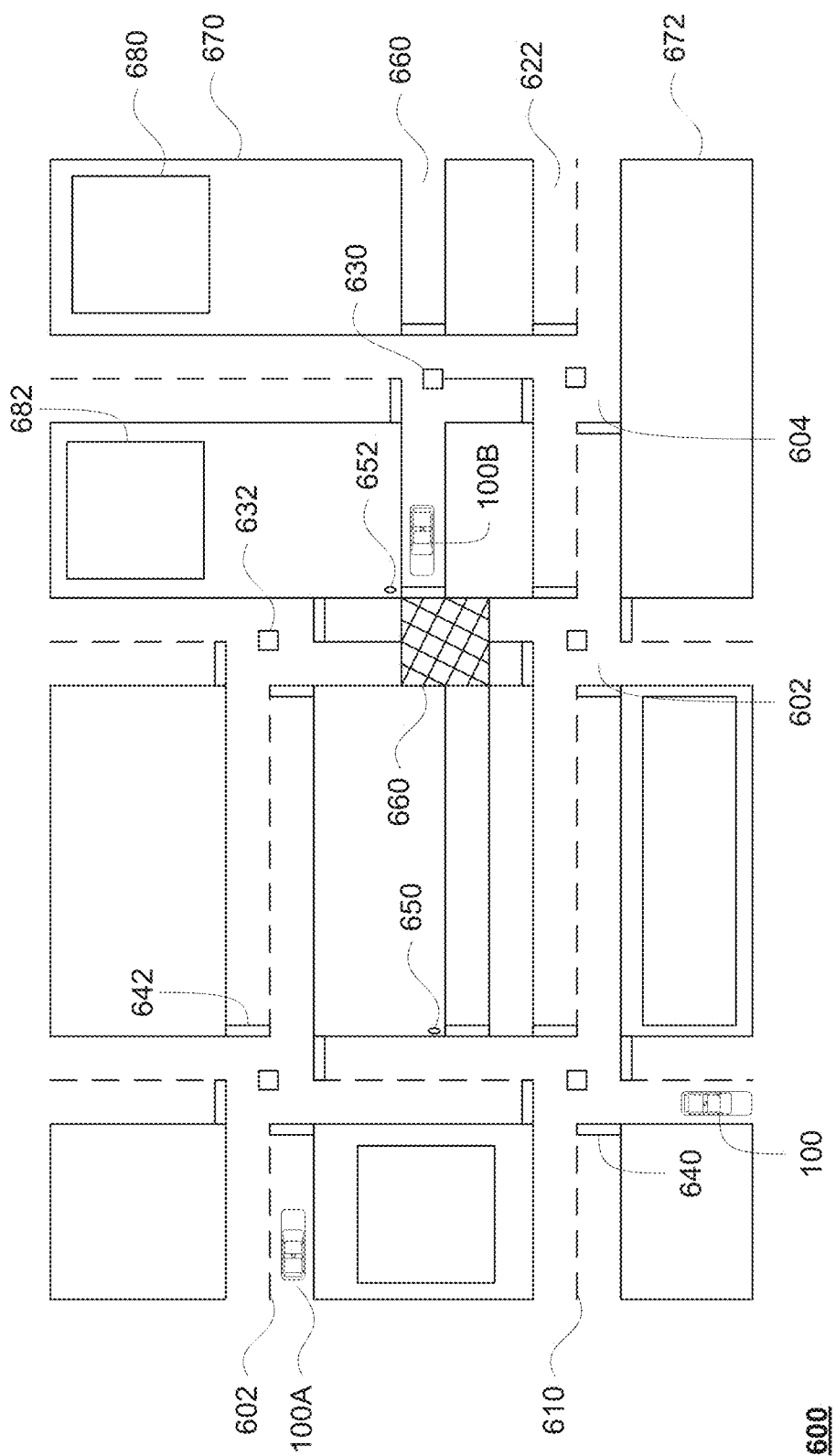
FIG. 6 is an example bird's eye view of a geographic area in accordance with aspects of the disclosure.

FIG. 6 depicts vehicles 100, 100A, and 100B being maneuvered on a section of roadway 600 corresponding to the section of roadway of FIGS. 2A and 2B. As shown in FIG. 6, section of roadway 600 includes lanes 602, 604, lane lines 610, 612, lanes 620, 622, traffic signal lights 630, 632, stop lines 640, 642, stop signs 650, 652, areas 660, 670, 672, and structures 680, 682 respectively corresponding to intersections 202, 204, lane lines 210, 212, lanes 220, 222, traffic signal lights 230, 232, stop lines 240, 242, stop signs 250, 252, areas 260, 270, 272, and structures 280, 282 of the roadmap information 200A of FIG. 2A.

Again, each vehicle may periodically or constantly provide data reports to the server computing devices 410 using network 460. Each of vehicles 100, 100A, and 100B respective positioning system 170 may provide that vehicle's computing device 110 with the vehicle's location, position as well as environmental information from the vehicle's sensor box 302. In this regard, as noted above, the computing devices 110 may also receive, monitor or otherwise collect information from the sensors of the sensor box 302. The computing devices 110 may then send this information to the server computing devices 410.

Figure 7:
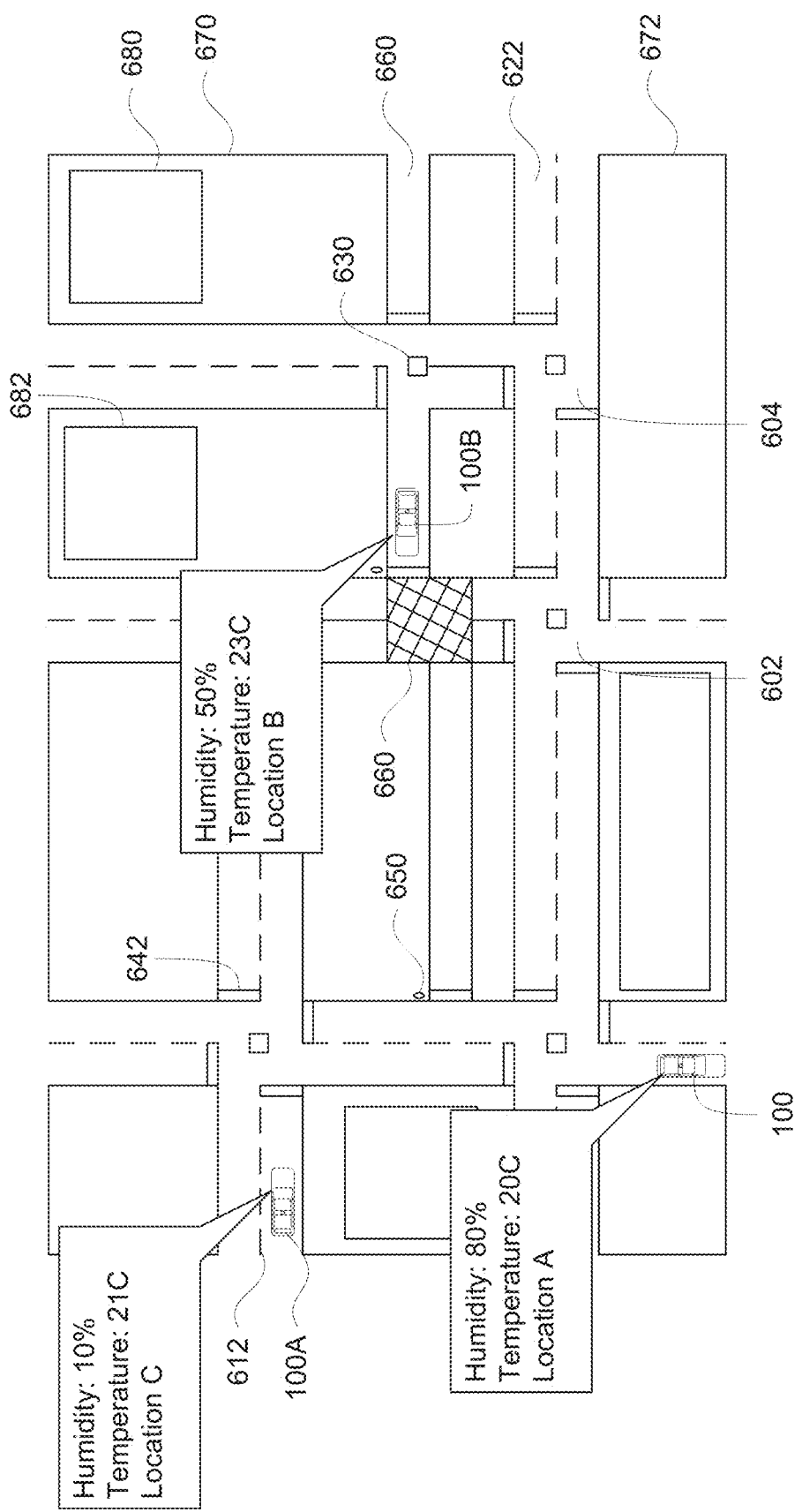
FIG. 7 is an example representation of data in accordance with aspects of the disclosure.

FIG. 7 depicts an example of information sent by vehicles of the fleet and received and tracked by the server computing devices 410. For instance, each of vehicles 100, 100A, and 100B may generate a report, notification, or data report 710, 720, 730, respectively, which is sent by the computing devices 110 of the respective vehicle to the server computing devices 410. Each of these data reports may include a location as well as the environmental information collected at that location. In this example, vehicle 100 is reporting low relative humidity (for instance, 10%) and a temperature of 21 C at coordinates for location A, vehicle 100B is reporting moderate relative humidity (for instance, 50%) and a temperature of 23 C at coordinates for location B, and vehicle 100C is reporting high relative humidity (for instance 80%) and a temperature of 20 degrees at coordinates for location C. The temperature references used herein are merely examples shown in Celsius though other scales, such as Fahrenheit or Kelvin may also be used. Further, the data reports may also include information regarding the dew point within a respective sensor housing as well as a dew point for the vehicle's external environment. Alternatively, the dew points may be determined by the server computing devices by inputting the reported relative humidity and temperature information into any known dew point conversion calculation. The server computing devices 410 may then use these data reports to update the environmental information of the environmental map stored in storage system 450.

In addition, the server computing devices may then send this up to date environmental map information to the vehicles to the fleet. For instance, the server computing devices 410 may send updates to the vehicles of the fleet, such as vehicles 100, 100A, and 100B. These updates may include the entire environmental map for a given area proximate to each vehicle or all of the vehicles. As another example, the updates may be limited to only the changes made to the environmental map for some predetermined period of time and/or since a prior update was last sent out, information within a certain distance of or otherwise relevant to a particular route that the vehicle is currently following, or information within a certain distance (driving or linear) from a current location of the vehicle. This may allow each of the vehicles of the fleet, including vehicle 100, to replace or update the local copy of the environmental map information 200B each time an update is received from the server computing devices 410.

To determine how the environmental information, for instance temperature, relative humidity, and/or dew point information provided in the environmental map information 200B, will affect the vehicle's sensors and/or perception system, the vehicle's computing devices may receive sensor information from the temperature and relative humidity sensors of the sensor housings of the perception system. For instance, the computing devices 110 may receive temperature and relative humidity measurements from the one or more temperature and relative humidity sensors 350, 352, 360, 362, 370, 372, 380, 382 of the sensor housings 310, 312, 320, 330. These measurements may thus correspond to the current relative humidity levels and/or current temperatures within the sensor housings. In other words, the computing devices 110 are provided with up to date relative humidity and or temperature measurements from inside each of the sensor housings 310, 312, 320, 330. The computing devices 110 may also determine a dew point within each sensor housing by inputting the relative humidity and temperature measurements into any known dew point conversion calculation.

The computing devices 110 may then use relative humidity and temperature measurements and the dew point for the area inside of a given sensor housing in combination with the environmental map information 200B to estimate a condition of a sensor within the given sensor housing currently and/or a future time. For instance, using these measurements and the dew point, the computing devices 110 may be able to determine whether the sensor or sensors within a given sensor housing can function properly given current conditions inside and outside the sensor housing. By having measures of external ambient temperature and relative humidity and a dew point from the environmental map information 200B as well as measurements of temperature and relative humidity and a dew point inside of a sensor housing, the computing devices can make assumptions and quantitative calculations on the risk of having condensation on the inside of a sensor housing and thus estimate whether the sensor within the sensor housing is expected to function normally or may be subject to condensation risk which can affect the effective functionality of the sensor.

In order to do so, computing devices 110 may determine an expected change in the condensation or condensation risk within the sensor housing as the vehicle drives through various areas according to the environmental map information 200B. Using this in combination with the relative humidity measurement within a given sensor housing, the computing devices may estimate how the change in temperature will affect the sensor or sensors within the given sensor housing given the relative humidity level. For instance, if there is water or high relative humidity inside of a given sensor housing and the temperature inside of the sensors is several degrees higher than the external ambient temperature or temperatures according to the environmental map information 200B at locations through which the vehicle will be driving to reach a particular destination, moisture in the sensor housing may begin to condense thereby causing the sensor housing to "fog up." This condensing and fogging may lead to inaccurate sensor readings or other reductions in the effectiveness of the sensor with the given sensor housing.

For example, the computing devices 110 may consider how changes in temperature, relative humidity level, and dew point measured by relative humidity sensors within the given sensor housing over time as compared to actual or expected ambient temperature, relative humidity level, and dew point will affect condensation and fogging within the sensor housing. Situations in which the temperature within a sensor housing is lower than the dew point for an area through which a vehicle is driving or situations in which the dew point within a sensor housing is higher than the ambient temperature through which the vehicle is driving, may increase the amount of condensation or may indicate high condensation risk. As an example, a first vehicle drives through area A and reports that the dew point for the ambient air at that time is 20 C. A second vehicle is about to drive through area A and a sensor within the second vehicle's sensor housings is reporting an internal temperature of 10 C. As this internal temperature is lower than the dew point of area A, if the second vehicle drives through area A in its current state, the expected condensation risk would be high or rather, condensation would be expected to form within the sensor housing. As another example, if the temperature and relative humidity sensors within a sensor housing of a third vehicles are reporting temperature and relative humidity measurements corresponding to a dew point of 20 C, and the third vehicle is about to drive through an area B where the last reported ambient temperature is 5 C, the expected condensation risk if the third vehicle were to drive through area B in the third vehicle's current condition would be high or rather, condensation would be expected to form within the sensor housing In another example, where vehicle 100 is driving shortly after a day time rain shower followed by sunshine and warmer temperatures, the amount of condensation or condensation risk may increase significantly in a short period of time even though it may take some time for condensation and fog to form inside the given sensor housing. As another example, driving up a mountain, hill or other similar incline where the ambient temperature drops rapidly and relative humidity increases due to gained elevation, may increase the amount of condensation or condensation risk. As a further example, if a vehicle enters an air conditioned or otherwise cool parking deck or depot area from a hot and humid environment, this may also increase the amount of condensation or condensation risk. This may be especially apparent where the sensor housing is leaking or not completely sealed.

The vehicle may be controlled in accordance with the estimated condition, in other words the change in the amount of condensation or condensation risk within the given sensor housing. For instance, if condensation within a given sensor is expected to increase (i.e. where the condensation risk is high) when a vehicle drives through a particular area, this may affect the functionality of the sensor or sensors within the given housing. As an example, the sensors within a sensor housing of a vehicle, such as vehicle 100, may report a temperature and relative humidity of 30 C and 80%, respectively, corresponding to a dew point of 28 C. If vehicle 100 is about to drive into a cooled parking deck or up to a higher elevation (such as up a mountain) where the ambient air is reported to be 18 C, then the risk of condensation would be high or rather, condensation would be expected to form or increase within the sensor housing. In this situation, the amount of condensation may actually affect the functionality of lidar or camera sensors within the sensor housing such that these sensors may no longer function properly. In other words, the information provided by such sensors to the computing devices 110 may be unreliable and it may be dangerous to allow the computing devices to use such information to make driving decisions for the vehicle 100.

Based on whether the vehicle's sensors would not be able to function properly, the computing devices 110 may make a determination of whether it is safe or appropriate to drive the vehicle autonomously based on information that will be generated by those sensors. In other words, the computing devices 110 may make the determination that the condensation risk is too high for the vehicle to operate in the autonomous mode. For instance, depending on the type and field of view of the sensor (i.e. whether another sensor is properly functioning and available to capture similar information or not), it may not be safe to allow the computing devices to control the vehicle autonomously. In other words, camera and lidar sensors may be more sensitive to condensation than radar or sonar sensors. As such, the computing devices may prevent the vehicle from entering the autonomous driving mode, and may require that the vehicle and/or sensor housing be serviced before doing so.

Figure 8:
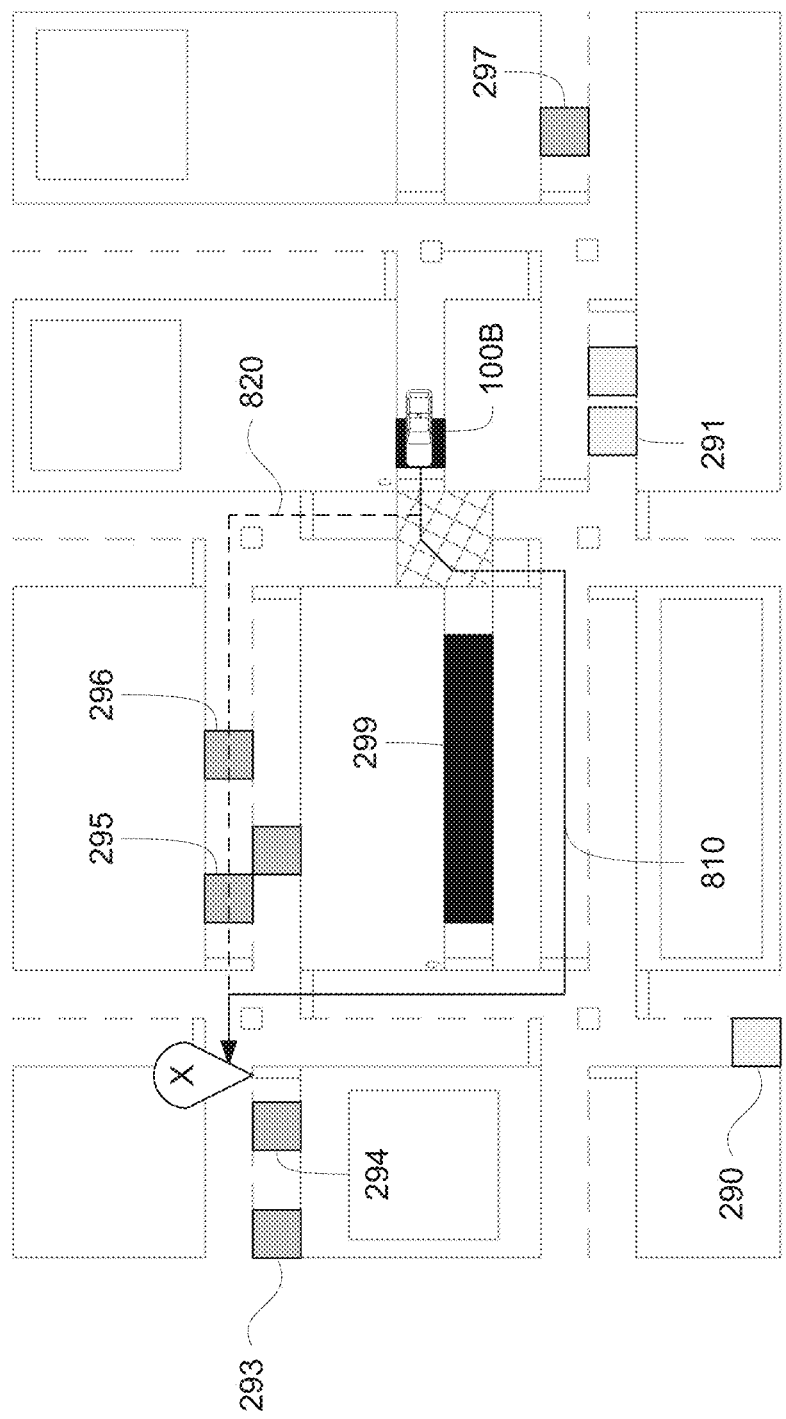
FIG. 8 is an example representation of data in accordance with aspects of the disclosure.

As an alternative, rather than completely preventing the vehicle from entering the autonomous driving mode, the computing devices may determine a route for the vehicle to reach the destination. For instance, the environmental map may be used to identify areas of particular relative humidity or temperatures at which the relative humidity levels of a given sensor housing would cause the environment within the sensor housing to reduce the effectiveness of the sensor. A route to the destination may then be determined which avoids the identified areas. For instance, referring to FIG. 8 which depicts the location of vehicle 100B of FIGS. 6 and 7 overlaid on the environmental map information 200B of FIG. 2B, if vehicle 100B needs to reach the location of marker X, the computing devices 110 of vehicle 100B may route vehicle 100B along route 810 rather than route 820 in order to avoid the areas of blocks 292 and 293 which may not be suitable for the current conditions of the sensor housings of vehicle 100B for which the computing devices have current internal temperature and/or relative humidity measurements, even though the route 810 may be longer in distance (and possibly time) than route 820.

In addition or alternatively, the aforementioned information can be used to determine whether a given sensor housing's environmental seal or sealing capabilities are compromised. For instance, the relative humidity measurements taken over time from within the given sensor housing can be used to calculate the actual water content in the sensor housing. Then by comparing the actual amount of water to an expected (or acceptable amount of water) which may correspond to the ambient relative humidity levels (where the sensor housing is configured to exchange moisture with the external environment), the vehicle's computing devices may determine whether the sensor housing has too much or an extra water content inside. If so, there may be an issue or problem with the sensor's seal or sealing capabilities. In such situations, the computing devices 110 may be required to only route the vehicle through areas where there is little to no expected condensation or condensation risk until the sensor housing can be serviced. Alternatively, the computing devices 110 may instead identify a location to park the vehicle and wait until the sensor housing dries out (i.e. the relative humidity level drops and/or the dew point changes to a more favorable level.

Figure 9:
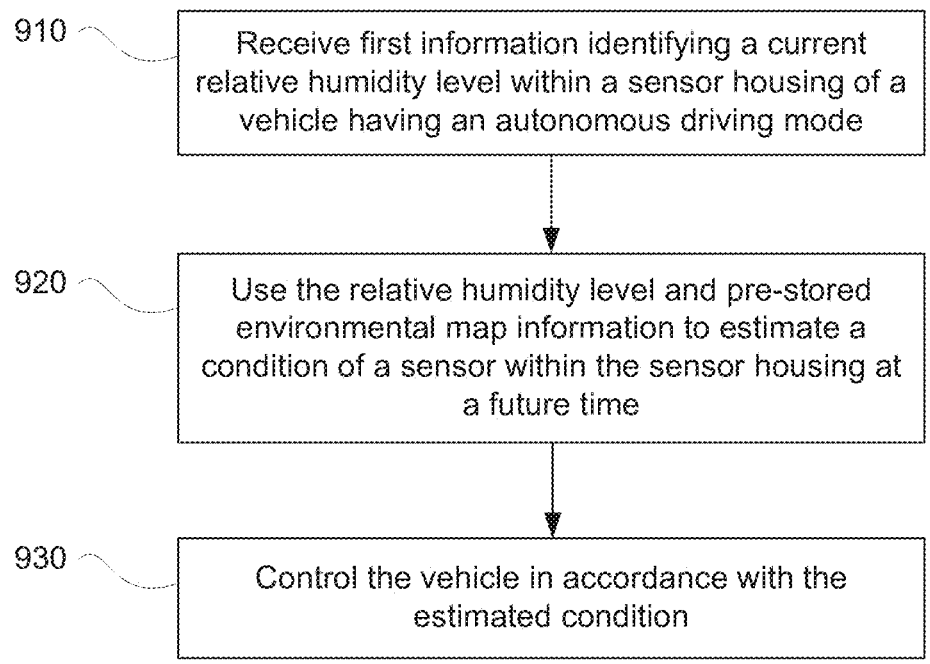
FIG. 9 is an example flow diagram in accordance with aspects of the disclosure.

FIG. 9 includes an example flow diagram 800 of some of the examples for controlling a vehicle as described above. In this example, the steps of flow diagram may be performed by one or more processors of one or more computing devices, such as processors 120 of computing devices 110 of vehicle 100. For instance at block 910, first information identifying a current relative humidity level within a sensor housing of a vehicle having an autonomous driving mode is received. At block 920, the relative humidity level and pre-stored environmental map information are used to estimate a condition of a sensor within the sensor housing at a future time. At block 930, the vehicle is controlled in accordance with the estimated condition.

As noted above, the environmental map may include other information collected by sensors of the vehicles such as air quality and/or solar irradiance information. For instance, sensor box 302 of vehicle 100 may provide air quality and/or solar irradiance information for the areas through which vehicle 100 is driven. This information may be sent to the server computing devices 410 and used by the server computing devices 410 to update the environmental map stored in the storage system 450. In addition, the server computing devices 410 may also supplement the environmental map with information from stationary sensor devices which can collect and provide air quality and/or solar irradiance information as well as other sources of air quality information such as online resources.

At least some of the air quality information may be used to avoid driving or dropping off passengers in certain areas. For instance, vehicles 100, 100A, and 100B may each be used to provide transportation services to passengers. In this regard, as noted above, the server computing devices 410 may also function as a dispatching system receiving requests for transportation services to and from different locations. The server computing devices 410 may then select an available vehicle of the fleet and send dispatching instructions to the selected vehicle. These dispatching instructions may include instructions to avoid certain areas having poor air quality characteristics, or air quality at or below a particular level or having certain PM measurements as provided in the environmental map of the storage system 450 and or simply instructions to avoid areas with such air quality characteristics.

In this regard, if a passenger has a medical condition where such a passenger should avoid stopping and/or driving through locations with poor air quality, the dispatching instructions and/or the local version of the environmental map stored at the vehicle may be used by the computing devices 110 to route around such areas having the aforementioned poor air quality characteristics. Similarly, if the passenger was requesting to be dropped off in a location with such air quality characteristics, the passenger, via the passenger's client computing device such as client computing devices 420 or 430, may be provided with a warning notification and/or an option to be dropped off in another location having air quality that is better than the poor aforementioned air quality characteristics. Similarly, if the passenger was requesting to be picked up in a location with the aforementioned poor air quality characteristics, that passenger's trip may be prioritized in order to provide a vehicle to the passenger more quickly.

Similarly, at least some of the solar irradiance information may be used to determine how long the vehicle, or rather, the sensors and sensor housings, can be outside or without sun protection without providing additional cooling or how long the sensors and sensor housings can be outside without sun protection before the sensors and sensor housings show signs of damage from ultraviolet light.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
receiving, by one or more processors, first information identifying a current relative humidity measurement within a sensor housing of a vehicle having an autonomous driving mode;
using, by the one or more processors, the relative humidity measurement and pre-stored environmental map information to estimate a condition of a sensor within the sensor housing at a future time; and
controlling, by the one or more processors, the vehicle in accordance with the estimated condition.

2. The method of claim 1, further comprising:
receiving second information identifying ambient temperature information for a driving environment of a second vehicle having an autonomous driving mode; and
using the received second information to update the environmental map, and wherein the updated environmental map information is compared to the relative humidity measurement.

3. The method of claim 1, further comprising receiving second information identifying a current temperature within the sensor housing, wherein the environmental map includes temperature information, estimating the estimated condition includes using the temperature information to estimate an expected change in temperature within the sensor housing.

4. The method of claim 3, wherein estimating the estimated condition includes estimating how the expected change in temperature and current relative humidity measurement will affect functionality of the sensor.

5. The method of claim 1, further comprising determining a current dew point within the sensor housing, wherein estimating the estimated condition includes using the current dew point to estimate an expected change in condensation within the sensor housing.

6. The method of claim 1, wherein the environmental map includes dew point information and estimating the estimated condition includes using the dew point information to estimate an expected change in condensation within the sensor housing.

7. The method of claim 1, further comprising:
receiving second information identifying ambient relative humidity information for a driving environment of a second vehicle having an autonomous driving mode; and
using the received second information to update the environmental map, and wherein estimating the estimated condition includes comparing the updated environmental map information to the relative humidity measurement.

8. The method of claim 1, further comprising receiving second information identifying a current temperature within the sensor housing, and wherein the current temperature is used to estimate the estimated condition.

9. The method of claim 1, wherein controlling the vehicle includes preventing the vehicle from entering the autonomous driving mode.

10. The method of claim 1, wherein controlling the vehicle includes:
preventing the vehicle from entering the autonomous driving mode until the sensor housing is serviced; and
after the sensor housing has been serviced, allowing the vehicle to enter the autonomous driving mode.

11. The method of claim 1, wherein controlling the vehicle includes:
identifying one or more geographic areas that are expected to affect operation of the sensor in a particular way based on the estimated condition;
determining a route to a destination that avoids the identified one or more geographic areas; and
controlling the vehicle to follow the route in the autonomous driving mode.

12. The method of claim 1, further comprising:
receiving second information identifying a new current relative humidity measurement within the sensor housing; and
using the relative humidity measurement and the new relative humidity measurement to determine whether there is a problem with a seal of the sensor housing.

13. A system comprising one or more processors configured to:
receive first information identifying a current relative humidity measurement within a sensor housing of a vehicle having an autonomous driving mode;
use the relative humidity measurement and pre-stored environmental map information to estimate a condition of a sensor within the sensor housing at a future time; and
control the vehicle in accordance with the estimated condition.

14. The system of claim 13, wherein the one or more processors are further configured to:
receive second information identifying ambient temperature information for a driving environment of a second vehicle having an autonomous driving mode; and
use the received second information to update the environmental map, and wherein the updated environmental map information is compared to the relative humidity measurement.

15. The system of claim 13, wherein the environmental map includes temperature information and the one or more processors are further configured to:
receive second information identifying a current temperature within the sensor housing; and
estimate the estimated condition by using the temperature information to estimate an expected change in temperature within the sensor housing.

16. The system of claim 15, wherein the one or more processors are further configured to estimate the estimated condition by estimating how the expected change in temperature and current relative humidity measurement will affect functionality of the sensor.

17. The system of claim 13, further comprising determining receiving second information identifying a current dew point within the sensor housing, wherein estimating the estimated condition includes using the current dew point to estimate an expected change in condensation within the sensor housing.

18. The system of claim 13, wherein the environmental map includes dew point information and estimating the estimated condition includes using the dew point information to estimate an expected change in condensation within the sensor housing.

19. The system of claim 13, wherein the one or more processors are further configured to:
   receive second information identifying ambient relative humidity information for a driving environment of a second vehicle having an autonomous driving mode; and
   use the received second information to update the environmental map, and
   compare environmental map information to the relative humidity measurement in order to estimate the estimated condition.

20. The system of claim 13, further comprising the vehicle.

* * * * *

UNITED STATES PATENT AND TRADEMARK OFFICE
CERTIFICATE OF CORRECTION

PATENT NO. : 10,754,336 B2
APPLICATION NO. : 16/014591
DATED : August 25, 2020
INVENTOR(S) : Mehmet Arda Akman It is certified that error appears in the above-identified patent and that said Letters Patent is hereby corrected as shown below:

In the Claims

Claim 2, Column 17, Line 30-31:
Now reads "the environmental map,"; should read -- environmental map information, --

Claim 6, Column 17, Line 49:
Now reads "the environmental map"; should read -- environmental map information --

Claim 7, Column 17, Lines 59-60:
Now reads "the environmental map,"; should read -- environmental map information, --

Claim 14, Column 18, Lines 43-44:
Now reads "the environmental map,"; should read -- environmental map information, --

Claim 18, Column 18, Lines 66-67:
Now reads "the environmental map"; should read -- environmental map information --

Claim 19, Column 19, Lines 10-11:
Now reads "environmental map"; should read -- environmental map information, --

Claim 19, Column 19, Line 12:
Now reads "compare environmental map information"; should read -- compare the environmental map information, --

Signed and Sealed this
Fifth Day of January, 2021

Andrei Iancu
*Director of the United States Patent and Trademark Office*